July 14, 1964 M. KLEIN 3,140,917
POLYMERIZATION REACTOR
Filed Jan. 19, 1960 7 Sheets-Sheet 4

INVENTOR.
MAX KLEIN
BY
*A. A. Orlinger*
ATTORNEY

July 14, 1964  M. KLEIN  3,140,917
POLYMERIZATION REACTOR
Filed Jan. 19, 1960  7 Sheets-Sheet 6

INVENTOR.
MAX KLEIN

BY A. A. Orlinger
ATTORNEY

July 14, 1964 M. KLEIN 3,140,917
POLYMERIZATION REACTOR
Filed Jan. 19, 1960 7 Sheets-Sheet 7

INVENTOR.
MAX KLEIN
BY *A. A. Orlinger.*
ATTORNEY

United States Patent Office 3,140,917
Patented July 14, 1964

3,140,917
POLYMERIZATION REACTOR
Max Klein, Red Bank, N.J., assignor, by mesne assignments, to Borg-Warner Corporation, Chicago, Ill., a corporation of Illinois
Filed Jan. 19, 1960, Ser. No. 3,290
15 Claims. (Cl. 23—252)

This invention is that of an apparatus that enables the carrying out, on a commercial production scale, of the so-called bulk (or mass) polymerization of polymerizable organic substances that require heating to initiate their polymerization which thereafter continues exothermically (i.e. with evolution of heat) to form thermoplastic polymerization products. More specifically, this new apparatus enables the commercial bulb or mass polymerization of unsaturated polymerizable organic substances that polymerize by addition, such as the vinyl compounds which, like styrene, are thus capable of forming thermoplastic polymerization products.

The apparatus of the invention not only has an inordinately low construction cost but also high productive capacity with easy operation and maintenance, of high quality polymer from various grades of monomer.

The extensive heat evolved by the exothermic reaction in the autopolymerization stage in the polymerization of vinyl compounds, such as styrene, and the attendant danger of runaway polymerization, have always presented serious problems. Solution polymerization allows control of the heat, but introduced other problems such as (1) that in the mechanical stirring of highly viscous solutions, (2) the difficulty in removing the last ten percent of solvent from the polymer, (3) reduction in polymerization rate, and also in the molecular weight of the final polymer; and still others.

The story is relatively similar for emulsion polymerization and suspension polymerization. In them, while no solvent has to be removed from the polymer, the water of the emulsion or suspension needs to be removed from it. Yet, some water and also the emulsifying or stabilizing agents then contaminate the final product. In addition, with these polymerization methods there is also the cost of the additional apparatus for the further processing, including drying.

The various disadvantages in these three different methods of polymerizing these starting materials dispersed in another liquid emphasize the great need for a practical and economical commercial means for bulk or mass polymerization (i.e. without dispersing the monomer in some non-participating liquid as a vehicle), and the even still greater need for a relatively simple and not too costly apparatus for use in carrying out bulk polymerization.

Vinyl compounds have been polymerized in mass in, for example, one gallon glass jugs. This required destroying the jug to recover the finished polymer. Thereby, for the production of each merely seven pound quantity of polymer a ten cent jug was destroyed, adding almost one and one-half cents per pound to the cost.

Attempts to avoid glass and to increase the quantity of monomer handled led to consideration of exceedingly costly and involved apparatus with ceramic inside coating and complicated piping arrangements through the polymerization zone, and taking cumbersome operation. These disadvantages have been a constant drawback to progress toward practical commercial scale production of a high quality of these polymers in a suitable price range.

The invention overcomes these many disadvantages and difficulties by making available a comparatively very low cost apparatus of simple construction easily built from regularly available stock material, and enabling large scale and economic production of highest quality polymer by easy operation.

Considered broadly, my apparatus has any selected number of closed-sided and open-topped polymerization zones, each being sandwiched respectively between two completely closed heat-controlling-fluid cells, with a single wall plate of a non-ferrous light weight metal of high heat conductivity serving as a common wall between each respectively adjoining polymerization zone and heat-controlling-fluid cell; to which common wall, the respectively adjacent edges of the exposed sides of each pair of adjoining polymerization zone and control-fluid cell and the top and bottom of the latter are fixedly secured to make a rigid unitary structure comprising an extended series of adjoining compartments starting with a heat-controlling-fluid cell followed by a polymerization zone and alternating that way to end with a heat-controlling-fluid cell, whereby each pair of consecutive or adjoining polymerization zone and control-fluid cell is fixedly secured together through each respectively intervening common wall to make the entire overall rigidly fixed unit.

For the bottom of each polymerization zone (also called monomer zone) there is a closure adapted to permit downward removal of the contents of the polymerization zone to a level below its bottom; and an exposed wall of each heat-controlling-liquid cell has an inlet and also an outlet to permit heat-controlling-fluid to flow into and from the cell. The fixedly secured, rigid, unitary apparatus is supported by suitable means above the level to which the contents of the polymerization zones is to be withdrawn.

The significant feature in the very low cost of the apparatus and its simple structure easily built from regularly available stock material is shown by a construction of the apparatus, for example, essentially from at most a few different sizes of metal channels, for example, extruded aluminum channels, for the exposed walls of the polymerization zones and even for the heat-control-fluid cells, and a rolled or milled sheet metal such as aluminum for the common wall between each pair of them and the closures for the polymerization zones, along with angle irons, gaskets and nuts and bolts.

As the control-fluid-cell usually need not be as wide as the monomer chamber, a different size of metal, such as aluminum, channel provides the exposed walls of each of them respectively. The aluminum sheet is obtained in a width corresponding either to the height of the common wall or its width. It is cut into lengths to provide the number of common walls needed for the complete apparatus. The closures for the monomer chamber conveniently can be cut usually from this same stock.

The channel of the size for the exposed walls of the heat-control cell is cut to the lengths required for them; and the channel of the size for the exposed sides of the monomer chamber is cut into lengths equal to their height. The necessary holes to permit passage of bolts are drilled through the plates for the common walls just inside their edges and in corresponding locations on the flanges or skirts of the channels.

The simplicity in the building up or assembly of the apparatus is readily seen from the following description of a presently preferred embodiment of the apparatus, shown for illustration in, but not to be restricted to, that of the accompanying drawings, in which.

Figure 1:
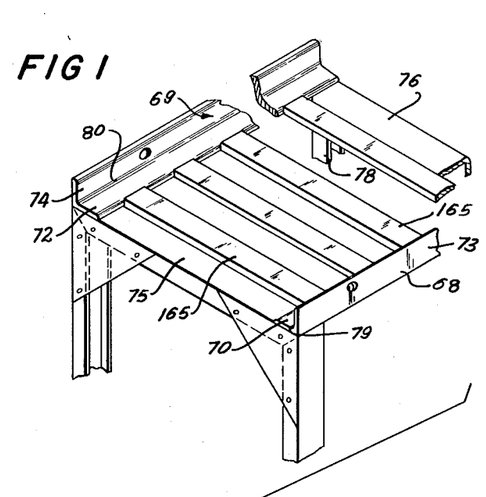
FIG. 1 is a perspective view of a series of alternate polymerization zones and heat-controlling-cells fixedly secured as an overall rigidly fixed unit drawn in expanded relation to its supporting means, shown in broken and fragmentary form, and on which are transversely mounted bottom closures for the polymerization or monomer zones.
Figure 2:
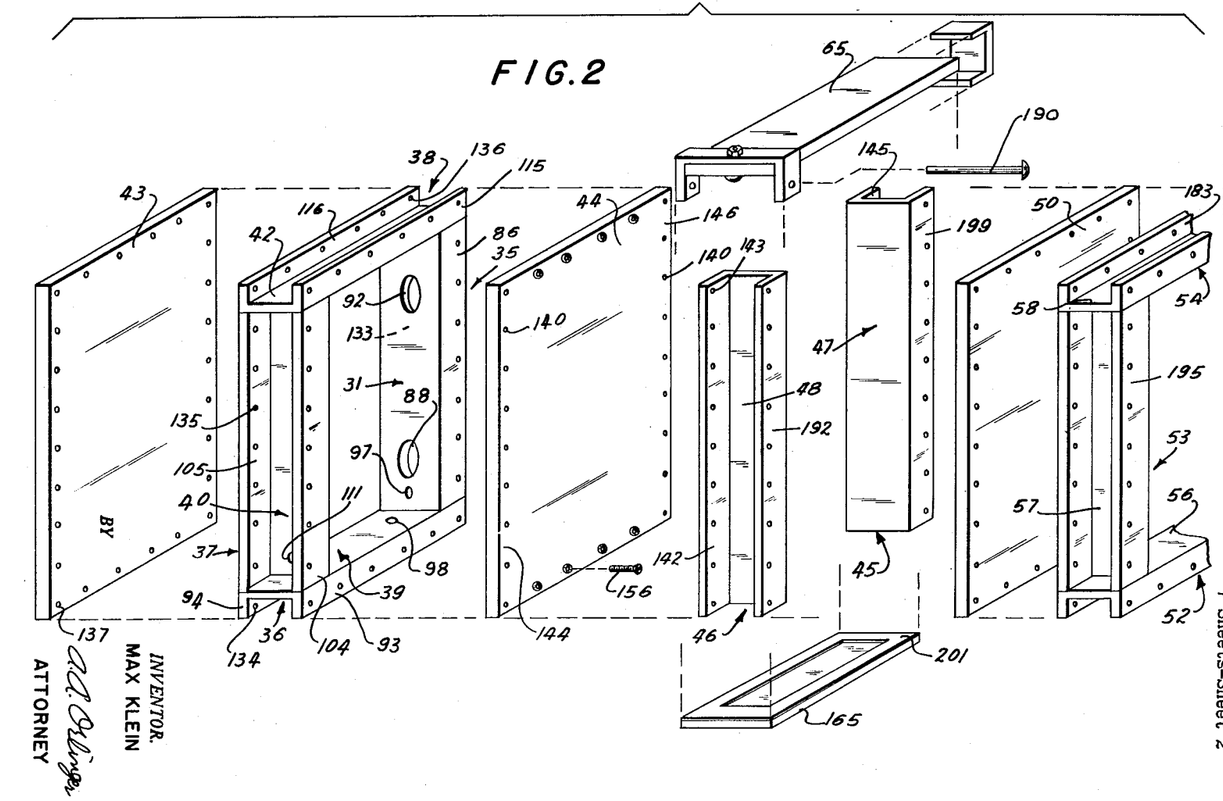
FIG. 2 is an expanded view of the assembly of the series including an end wall, the exposed walls of a fluid-control chamber, a common wall, the exposed side or vertical walls of a polymerization or monomer zone and closures for it, an intervening wall, and the exposed walls of a heat-control cell.
Figures 3, 4, 5:
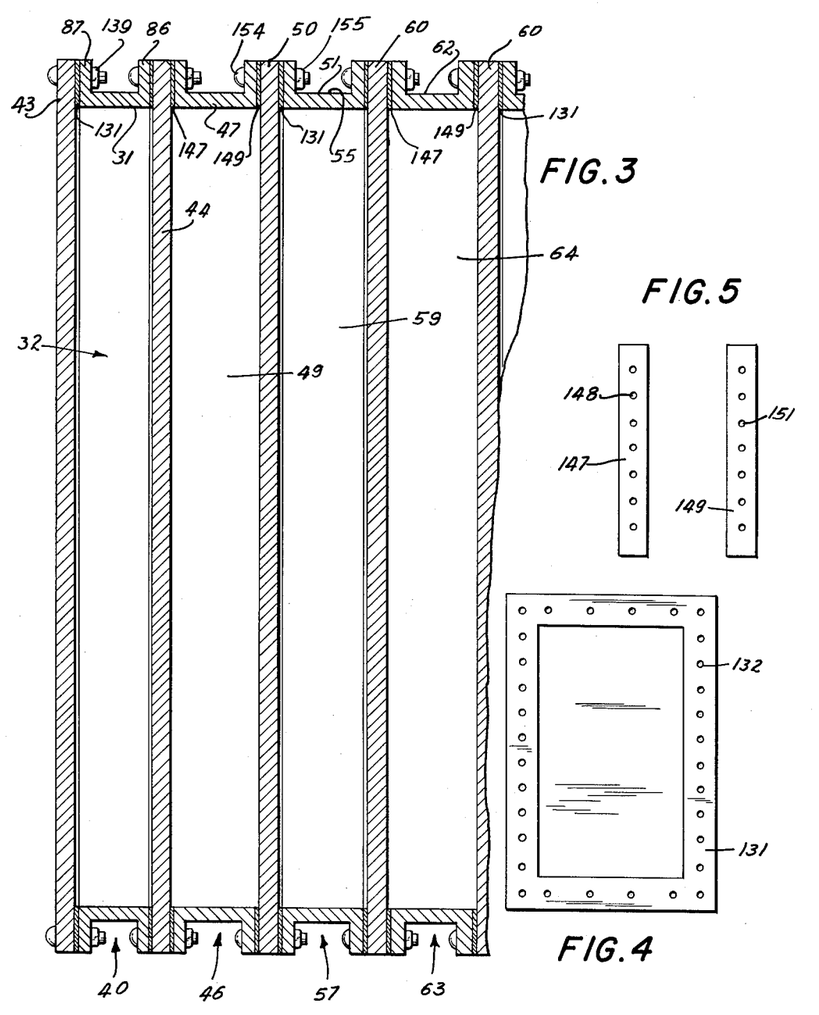
FIG. 3 is a longitudinal horizontaly transverse view along the line 3—3 through FIG. 1.
FIG. 4 is a type of gasket inserted between an intervening common wall and the flanges of the channel sections constituting the exposed walls of a heat-control cell.
FIG. 5 shows a pair of gaskets of a type used between an intervening common wall and the respective flanges of the channel sections constituting the exposed vertical walls of a polymerization zone.

The simple construction and low cost of the apparatus is noted strikingly from FIGURES 1 and 3. Also, the unusual simplicity in the building up or assembly of the apparatus is shown especially by FIGURES 2, 6 and 19. The structural features of the apparatus can be seen readily by following a description of its assembly.

An efficient assembly procedure is first to fit into an outer (i.e. exposed) wall 31 of an end heat-controlling-fluid cell (for brevity called "h-c-f cell") 32 (FIG. 3) a nipple 33 (FIG. 19) for conveying heat-controlling fluid from a feed manifold (not shown) into h-c-f cell 32 and a nipple 34 (not shown) to convey the fluid from the cell to a return manifold (also not shown); then to assemble the vertical channel 35 (which includes wall 31) with three other channels 36, 37 and 38 into, and each with its respective flanges extending outwardly from, the rectangle embracing also the three other outer walls 39, 40 and 42 respectively of h-c-f cell 32; and then to attach the end wall 43 to cell 32. Thereafter, the open (or right) side of the rectangle is closed with the second intermediate or common wall 44 which is joined with the channels 45 and 46 that provide the vertical or exposed walls 47 and 48 of the first polymerization zone 49. Then the rectangle of channels 51, 52, 53 and 54 providing the exposed walls 55, 56, 57 and 58 for the next h-c-f cell 59 and the common wall 60 to complete the cell, and the vertical channels 62 and 63 for the next polymerization zone 64 are similarly assembled. Thereafter, the cover 65 for the first polymerization zone 49 is assembled and hinged in place.

This procedure for building up pair after pair of compartments consisting of an h-c-f cell and a polymerization zone advantageously may be followed by assembling the series of alternate h-c-f cells and polymerization zones directly on the supporting base (designated as a whole as) 67 for the assembled apparatus. Supporting base 67 is made up essentially of two angle irons 68 and 69 each having one flange 70 and 72 respectively horizontal and extending toward the other, and with its respective second flange 73 and 74 extending vertically.

The pairs of opposed far ends of the support angle irons 68 and 69 are rigidly fixed respectively to two end-joining members 75 and 76 each in turn supported in suitable manner, for example, rigidly fixed to its own pair of supporting legs 77–77a and 78–(78a, not shown). If the length of the angle irons, governed by the overall length of the series of compartments, requires it, an intermediate pair of supporting legs can be included and also suitable cross-braces extending along the length and between the pairs of supporting legs. The angle irons 68 and 69 are spaced apart from one another just about enough for the bases of the intervening common walls to fit fairly snugly between the opposed inside corners 79 and 80 of the angle irons.

The foregoing sketchy description of the overall assembly of the apparatus helps in understanding the following description of certain details of the assembly, seen, for example, in FIGURES 1 through 6 and 9.

Figure 19:
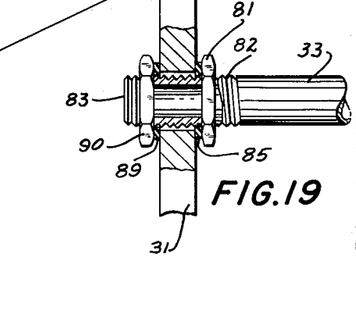
FIG. 19 is a fragmentary view of part of a vertical exposed wall of a heat-controlling-fluid cell showing a manner of joining a fluid inlet or outlet line to it.

For FIG. 19, a nut 81 is screwed onto, and rotated far enough along, the threads 82 of threaded end 83 of a heat-controlling-fluid conduit nipple 33 to enable that end 83 to hold outer gasket 85, to pass through orifice 88 between flanges 86 and 87 of channel 35, and to carry inner gasket or packing 89 and (inner) securing nut 90. After outer gasket 85 is placed around threads 82 next to nut 81, the threaded end 83 of nipple 33 is directed between flanges 86 and 87 of channel 35 and inserted through orifice 88 beyond the inner face of the base 31 of the channel.

Inner gasket 89 then is placed over the portion of thread 82 projecting inwardly beyond the base of channel 35. Then inner or securing nut 90 is fitted onto, and rotated over, the remaining exposed part of threads 82, and both nuts 81 and 90 are adjusted to make securing nut 90 hold that end of nipple 33 in fluid-tight engagement with base 31 of channel 35, with preferably little or no part of the threaded end 83 of the nipple 33 extending beyond nut 89.

Similarly, another heat-controlling-fluid conduit nipple 34 (not shown) with a similar threaded end is fitted in like manner with a nut and outer gasket and then directed between the same flanges 86 and 87 and inserted through orifice 92 in base 31 of channel 35 and similarly locked in fluid-tight connection with it by an inner gasket and securing nut.

Figure 6:
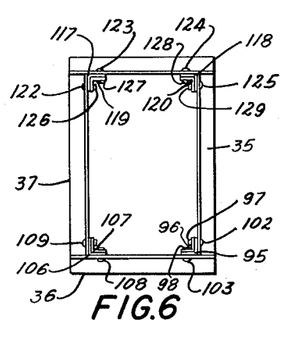
FIG. 6 is a side view of an assembly of two vertical channels with two horizontal channels bridging them, and joined together at the four corners by brackets bolted to them, with gaskets between the underside of each bracket and its corner formed by the meeting of the respective two channel ends.

Bottom channel 36 then is laid down on the outer edges of its flanges 93 and 94, with the clear or free side of its base 39 facing upward. Then channel 35 is held vertically and its lower end set down on top of the far (or right)

end of channel 36 (as seen in FIGS. 2 and 6) with the longitudinal outer edges of flanges 86 and 87 of channel 35 in line with the vertical outer edges of flanges 93 and 94 respectively of channel 36.

Then gasket 95 is placed in the corner thus formed by channels 35 and 36. L-bracket 96 is placed over gasket 95, and both are locked into that corner by bolts 97 and 98 inserted through bolt holes in them and corresponding bolt holes 99 and 100 in channels 35 and 36 respectively, and then drawn into fluid-tight engagement by tightening nuts 102 and 103 along bolts 97 and 98.

Channel 37 then is held similarly vertical and its lower end set down on top of the other (i.e. the near or left) end of channel 36 and with the longitudinal outer edges of flanges 104 and 105 of channel 37 in line with the vertical outer edges of that end of flanges 93 and 94 respectively of channel 36.

Then gasket 106 is placed in the corner thus formed by channels 36 and 37. L-bracket 107 is placed over gasket 106. Both are locked into their corner by bolts 108 and 109 inserted through bolt holes in them and corresponding bolt holes 111 and 112 in channels 37 and 36 respectively, and then drawn into fluid-tight engagement by tightening nuts 113 and 114 along bolts 108 and 109.

Top channel 38 to complete the rectangle of outer walls for h-c-f cell 32 then is placed with its flanges 115 and 116 extending upward and with the end portions of the free or clear face of its base 42 respectively on top of the upper ends of channels 35 and 37. Thereby there is bridged and closed the gap between them. The edges of the ends of channel 38 are aligned with the outer vertical edges of the flanges of channels 35 and 37 respectively.

Then these last two corners, thus formed between channel 38 and channels 35 and 37 respectively, are locked in liquid-tight engagement, in like manner as was done for the first two corners, by the corresponding gaskets 117 and 118 and their respective L-brackets 119 and 120, bolts 122, 123, 124 and 125, and nuts 126, 127, 128 and 129.

A gasket 131 like that shown in FIG. 4 and of dimensions to coincide with the annular rectangle formed by flanges 87, 94, 105 and 116 respectively of channels 35 through 38, and with bolt holes 132 to correspond in number, and meet in registry, with the correspondingly positioned bolt holes 133, 134, 135 and 136 on these flanges, is then placed in registry with them and with its bolt holes in registry with those in these flanges 87, 94, 105 and 116.

Then end (or closing) wall 43 for h-c-f cell 32, and of dimensions to coincide with the outer periphery of the rectangle formed by flanges 87, 94, 105 and 116, and with bolt holes 137 corresponding in number, and to meet in registry, with those 132 in gasket 131 and bolt holes 133 through 136 in these flanges, is placed with its bolt holes 137 in registry with those in the gasket and against its outer face.

Bolts 138 then are inserted singly through each separate corresponding set of bolt holes in registry in wall 43, gasket 131 and flanges 87, 94, 105 and 116 to lock them together with a corresponding nut 139 screwed on to each bolt to draw the members together in liquid-tight engagement.

Intermediate or common wall 44 has the same dimensions as end wall 43 and bolt holes 140 corresponding in number and location to those on flanges 86, 93, 104 and 115 of channels 35 to 38 respectively. Wall 44 serves to complete h-c-f cell 32 and as a common wall between it and polymerization zone 49.

Channels 45 and 46 serve as the rear and front vertical walls respectively of polymerization zone 49 and are as long as the height of common wall 44, and are positioned vertically with their flanges facing respectively away from one another.

Flange 142 of channel 46 has bolt holes 143 so positioned from its outer longitudinal edge and along its length to meet in registry with corresponding bolt holes 140 in the front vertical portion 144 of common wall 44.

Similarly flange 145 of channel 45 has bolt holes so positioned from its outer longitudinal edge and along its length to meet in registry with corresponding bolt holes 140 in the rear vertical portion 146 of common wall 44.

A gasket 147 (FIG. 5) of the same dimensions as the outer face of flange 142 of channel 46, has bolt holes 148 in number and location corresponding to those in flange 142.

Another gasket 131 is placed in registry with the rectangle formed by the other faces of flanges 86, 93, 104 and 115 of channels 35 through 38, and with its bolt holes 132 in registry with those in these flanges. Then intermediate and common wall 44 is placed with its bolt holes 140 in registry with those 132 in this gasket and against the face of the gasket.

Then gasket 147 is placed with its bolt holes 148 in registry with those 140 in the front vertical portion of common wall 44 and against that portion.

A band gasket 149 (FIG. 5) of the same dimensions as the outer face of flange 145 of channel 45, has bolt holes 151 in number and position corresponding to those in flange 145.

Then flange 142 of channel 46, gasket 147, common wall 44, the second rectangular gasket 131, and flange 104 of channel 37 are bolted together in fluid-tight engagement with one another, by inserting a bolt 152 through each set of their bolt holes in registry with one another, and starting in through flange 142 and coming out through flange 104, and pulling each bolt tight by screwing onto it a nut 153.

In similar manner band gasket 149 is placed with its bolt holes 151 in registry with those 140 in the rear vertical portion in common wall 44 and against that portion of it; and flange 145 of channel 45 is similarly positioned against gasket 149 with their respective bolt holes in registry; and then flange 145, gasket 149, rear vertical portion 146 of wall 44, the second gasket 131 and flange 86 of channel 35 are bolted into liquid-tight engagement with one another by bolts 154 and nuts 155, in the same manner as with the flange 142 of channel 46.

Thus channels 45 and 46 are set up as the opposed exposed walls 47 and 48 of polymerization zone 49. The bolt holes 140 along the bottom of common wall 44 and between the opposed bases or exposed walls 47 and 48 of channels 45 and 46 should be countersunk. Through those countersunk bottom holes and the second gasket 131 and flange 93 of channel 36 should be inserted bolts 156 with flat heads and frusto-conical sides between these heads and their shanks and of dimensions and design corresponding to those of these countersunk bolt holes that when a nut is screwed on to the other end of such flat-headed bolt to draw these parts into fluid-tight engagement with one another, the flat end of the head of the bolt is flush with that face of wall 44.

The same type of flat-headed bolts and countersunk bolt holes can be used on the polymerization zone 49 side along the top of common wall 44 between the opposed exposed walls 47 and 48 of channels 45 and 46. However, that is not as essential there as at the bottom. for the liquid monomer level in the zone usually is not so high that polymer should form at a level as high as that top line of bolts. These top parts also are bolted in fluid-tight engagement.

Preferably at this point in the assembling of the apparatus, what has been put together thus far can be carried onto the supporting base 67. Then the rest of the assembling can be conducted while the portion already completed rests on base 67, and fits snugly with its outermost upright edges (e.g. the outer longitudinal edges of the outwardly extending flanges of the vertically set flanges) against the opposing vertical faces of flanges 73 and 74 of angle-irons 68 and 69 respectively. Of course, the partially assembled series of compartments can be transferred to base 67 at any other convenient stage of its assembly.

Then another pair of heat-controlling-fluid conduit nipples, like nipples 33 and 34, are connected to channel 51 (FIGS. 1 and 2) in similar manner and by like nuts and gaskets as described for nipples 33 and 34 and channel 35. Channel 51 and channels 52, 53 and 54, together with corresponding L-brackets, corner gaskets and bolts and nuts, then are assembled as the annular rectangle of outer walls 55, 56, 57 and 58 for the next or second h-c-f cell 59, in the same manner as was done for the annular rectangle of outer walls for h-c-f cell 32.

Thereafter, with another pair of gaskets like gaskets 147 and 149 interposed between right hand flanges 161 and 162 of channels 45 and 46 respectively and the left hand face of the next common wall 50, and another rectangular gasket 131 interposed between the right hand face of wall 50 and the flanges of the rectangle of channels 51, 52, 53 and 54, all of them are bolted together in fluid-tight connection with one another in the same manner, and with the same two types of bolts and nuts, as was described for doing that with the flanges 86, 93, 104 and 115 of channels 35 through 38, a gasket 131, common wall 44, gaskets 147 and 149, and flanges 145 and 142 of channels 45 and 46 respectively. That completes polymerization zone 49 except for its bottom closure which is necessary, and a top closure particularly if the polymerization is to be conducted under pressure.

The bottom closure 165 (FIGS. 1, 2, 7 and 8) for a polymerization zone preferably is as long as the distance between the outer surfaces of the outer or exposed walls 47 and 48 of channels 45 and 46 respectively; and its width preferably is the sum of (i) the width of the polymerization zone between the opposing faces of the respective two common walls enclosing it and (ii) the thickness of both of those common walls. The bottom closure 165 needs to be at least thick enough to carry the static load that will be placed on it. Generally it can be as thick as the horizontal flanges 70 and 72 of the opposed angle-irons 68 and 69 of support base 67.

Bottom closure 165 can be attached, by suitable means that enable it to swing away from the bottom of the polymerization zone to leave its bottom entirely clear, either to the bottom of any of the parts of such zone or a h-c-f cell or to angle-irons 68 and 69 or any combination of these elements.

A simple and efficient manner of attachment is by a T-hinge 167 with its cross-bar 168 bolted by bolts 169 (FIG. 7) to the under-side of horizontal flange 72 of angle-iron 69, with its hinge-pin about at the edge of that flange, and its tongue bolted by bolts 171 to be the underside of that end of closure 165.

Figure 8:
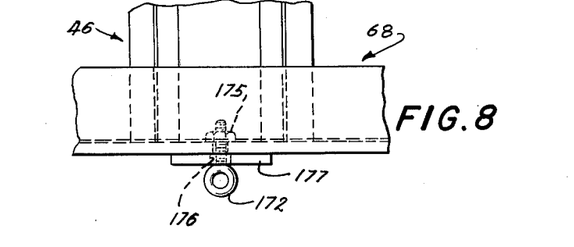
FIG. 8 is a vertical fragmentary view from the left hand side, and transversely to the direction, of FIG. 7.

The loose end of the closure 165 can be locked closed by slipping eye-ring 172 of an eye ring bolt 173, suspended through a swivel-aperture 174 in, from a nut 175 held on, horizontal flange 70 of angle-iron 68, through a vertical longitudinal slot 176 in the end, forward of base 48 of vertical channel 46 and under flange 70, of a longitudinal extension 177 attached by suitable attaching means such as bolt 178 and nut 179 to the loose end of closure 165, and giving eye-ring 172 a quarter turn (FIG. 8).

The shoulders of eye-ring 172 at their junction with shank 180 of bolt 173 force extension 177 tightly against the bottom of flange 70. Thereby extension 177 serves to force the closure 165 against the bottom edges of channels 15 and 16 and of common walls 44 and 50. When liquid monomer is to be carried directly in the polymerization zone, then a rectangular gasket inert to the monomer and its polymer is inserted at least between the borders of closure 165 that are the downward projections of those bottom edges of channels 15 and 16 and common walls 44 and 50, such as gasket 201.

Further alternate polymerization zones and h-c-f cells in the series of compartments of the apparatus are assembled alternately in the same manner as described for polymerization zone 49 and its bottom closure 165 and for h-c-f cells 32 and 49 until the last h-c-f cell is assembled from a rectangle of channels, as already described. Then such last rectangle is closed off as a complete h-c-f cell by bolting to it an end closure wall like wall 43.

While the apparatus can serve its purposes without a top closure provided for the polymerization zones, ordinarily it is desirable to use one, and necessarily if the polymerization is to be carried out under pressure or pressure is to be applied at some stage of the procedure.

Figure 9:
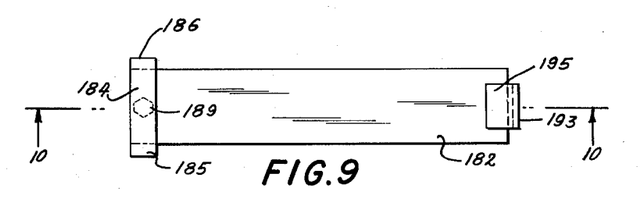
FIG. 9 is a top view showing a cover over a polymerization zone and means for attaching the cover to it.
Figure 10:
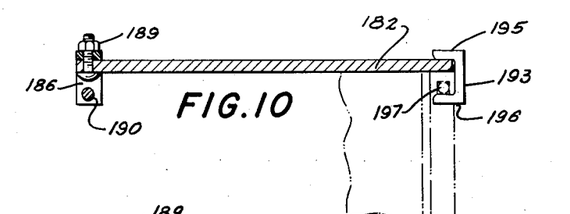
FIG. 10 is a vertically transverse view along the line 10—10 of FIG. 9.
Figure 11:
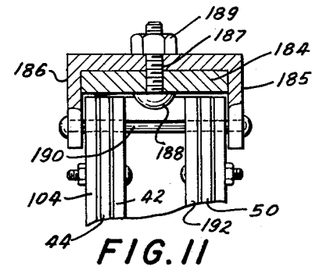
FIG. 11 is a fragmentary view in partial section through the left end of FIG. 9, showing more detail of the attaching means at that end of this top cover.

FIGURES 9, 10 and 11 illustrate a top closure suitable generally for any type of operation in the polymerization zones. Top closure or cover 182 is as wide as bottom closure 165 and preferably as long as the top edge of a common wall. From a channel whose inside faces of its flanges are apart a distance to straddle the thickness of flange 115 of channel 38, common wall 44, channel 46, common wall 50, and flange 183 of channel 54, there are cut as many sections (each called straddle 184) as there are polymerization zones. Each such section is cut as long as about the width of flange 142 (from its base 48 to its outer edge) of channel 46.

Cover straddle 184 is mounted over the hinge end of cover 182 and with its legs 185 and 186 depending and reaching to about the bases 58 and 42 of channels 54 and 38 respectively. Cover 182 and straddle 184, are bolted together by bolt 187 with its head 188 under cover 182 and the outer end of its shank threaded into nut 189. Instead of using bolt 187 and nut 189 to tie together cover 182 and straddle 184, a hole for a straight screw can be drilled and tapped through both of them and a screw, long enough to pass into both of them but not to project out beyond the second of them, is driven from the under-side of cover 182 into straddle 184 without projecting above it.

Then hinge pin 190 is passed through hinge pin holes in registry with one another in sequence in leg 185, flange 183 of channel 54, common wall 50, channel 46, common wall 44, flange 115 of channel 38, and leg 186. Apparently, hinge pin 190 can remain set as so inserted through these several members without requiring a nut to be threaded on to its projected end to hold it. Such nut can be used if desired.

Then also, instead of using the single long hinge pin 190 to pass through the several members, two separate shorter pins or bolts can replace it. One of these can be passed through the holes in registry with one another in leg 185, flange 183 of channel 54, common wall 50, and flange 192 of channel 46; the other can pass similarly through leg 186, flange 115 of channel 38, common wall 44, and flange 142 of channel 46; and with or without a nut threaded onto the projected end of each of these shorter pins.

Then the other or loose end of cover 182 can be held down by a small locking section 193 cut from one of the channels with with one flange 195 placed over that end of the cover and the other flange 196 pushed in under the lower end of a square head 197 of a bolt passing through flange 145 of channel 45, gasket 149, common wall 44, gasket 131 and flange 115 of channel 38. If desired, locking section 193 can be wide enough for its lower flange 196 also to engage the underside of the square head of a bolt projecting out of flange 199 of channel 45.

In conducting a polymerization with the apparatus, an extremely important consideration is the transfer of heat, either to initiate the polymerization, control the exothermic autopolymerization stage, and thereafter to complete the polymerization. In this apparatus, the transfer of heat between the heat-controlling fluid in the h-c-f cells and the monomer and its polymerization products in the polymerization zone is essentially completely through each pair of intervening or common walls 44 and 50 which are the heat transfer walls separating each polymerization zone from the pair of h-c-f cells, one on each side of the polymerization zone.

Thus, a very significant feature of the invention is in using for these heat transfer walls a relatively thin plate of a non-ferrous metal or alloy whose heat conductivity coefficient is within the range of that of aluminum, magnesium, copper and silver. These metals and their alloys then can serve as the heat transfer walls. Particularly effective are the light weight metals aluminum and magnesium, and their alloys. These are unusually effective because of the combination of their high heat-coefficients, strength with light weight, and inertness to the polymers to be prepared.

A further feature of the apparatus is to have these common or intervening or heat transfer walls as thin as the operating conditions permit. Thus, and especially with aluminum, the intervening walls can vary from about one-eighth to about one-half inch although somewhat over one-half inch or possibly a little under one-eighth inch can be used where conditions permit. Then also, a thickness of the common walls from about one-eighth inch to about one-quarter inch and especially about three-sixteenths of an inch has been found to be particularly effective.

Ordinarily, merely convenience in handling influences the height and the width of the polymerization zones (width being the distance between the bases 47 and 48 of channels 45 and 46 respectively). For generally efficient operation, the thickness of the polymerization zone could be up to six inches, and with provision of at least three square feet of heating surface per cubic foot of monomer. Satisfactory operation appears available with the apparatus with polymerization zone thickness up to even eleven inches and possibly greater.

While any suitable fluid, either gaseous or liquid, can serve for the heat-control, a liquid generally is more effective. Water is suitable in most operations.

Even though the apparatus is particularly applicable to the polymerization of unsaturated compounds that give thermoplastic polymerization products, it is also effective with others so long as heat input is needed to initiate the polymerization and heat withdrawal is required as in the autopolymerization step.

In carrying out polymerization with the apparatus, each inlet nipple 33 from the h-c-f cells is connected to a suitable branch from a heat-control liquid, such as water, supply manifold (not shown) connected with adequate means to enable having the necessary rate of flow. Similarly, each outlet nipple is connected to a branch into a return liquid manifold leading to suitable means to enable heating or cooling the liquid as required by the progress of the operation.

Suitable temperature observation means can be included in convenient places in the apparatus, including along any heat-control fluid branch conduit or the manifold. A significant advantage in the apparatus is that the combination of its features enables conducting the polymerization at a comparatively low temperature than without this apparatus. An experimental run, even in part of the apparatus, enables determining the conditions for operating regularly with a particular polymerization.

Figure 15:
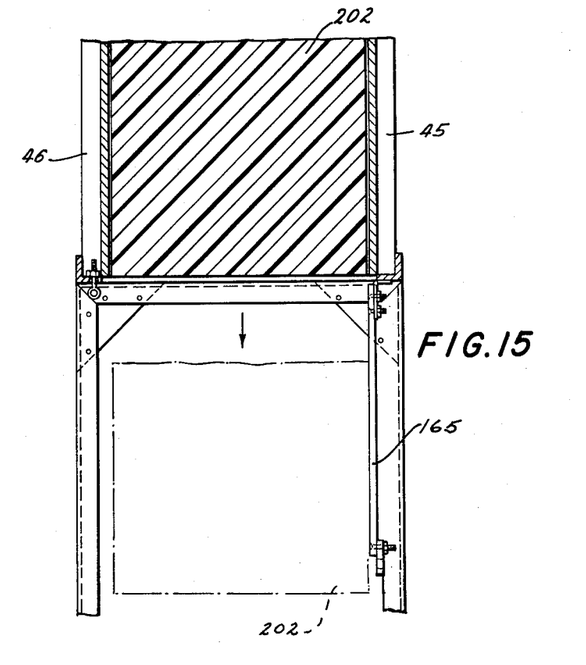
FIG. 15 is a vertical, side to side, transverse view through a polymerization zone showing a slab of finished polymer in it and below it in phantom the slab after it had slid down and out of the zone.

When a polymerization run is completed, each polymerization zone is opened by removing locking section 193 from the end of top closure 182 which is then swung open about its hinge pin 190; and eye-ring 172 is turned a quarter of a turn allowing bottom closure 165 to swing about its hinge 167 to the downward hanging position (as seen in FIG. 15). The slab 202 of finished polymer then is dropped out through the open bottom to the position shown in phantom in FIG. 15.

Figure 18:
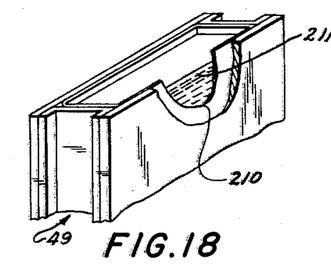
FIG. 18 is a fragmentary vertical perspective view of a polymerization zone showing an aluminum envelope in it and the liquid monomer in the envelope.

Sometimes different monomer compounds, or different colored polymers, are to be polymerized in successive runs. The need of cleaning any polymerization zones from one run to another to avoid contamination of one material with another if any of any of the polymers remain behind adhering to any part of the interior of the zone is avoided by inserting in the polymerization zone a monomer receiving envelope 210 of volume approximating that of the interior of the polymerization zone and shaped substantially like it (see FIGS. 16, 17 and 18). Such envelope is made of a material inert to the monomer and the resulting polymer 211 and readily separable from the latter, and advantageously, of aluminum foil.

Such aluminum foil envelope is prepared by placing about a wooden block 204 (of size and shape the same as the interior of zone 49) a length 203 of aluminum foil. The latter is long enough for it to extend beyond the exposed top of block 204 to permit the ends 207 and 208 of the foil 203 beyond the top of the block to be folded over one another to form a loosely closed top within the upward projection of the bounds of the top of the block.

The foil is wide enough for it to extend beyond each side of block 204 far enough to allow both of the opposing parts 205 and 206 of such extension on each side respectively to be brought together face to face and for the then overlying parts 205 and 206 thereafter as a unit to be folded over itself longitudinally at least twice to give a multiple fold lying within the boundaries of that end of the block.

To assure having a positive liquid-tight fold with the extensions 205 and 206, it is advantageous to brush along the inner side of them and of the bottom piece between them a band of a liquid composition adherable to aluminum, to serve like a damming material when the opposed thus coated surfaces of extensions 205 and 206 are contacted together.

Wooden block 204 with the not yet folded aluminum foil held about its bottom and two sides is then turned over with its exposed top facing downward, and the foil and block thus clamped between a suitable gripping or holding device such as a woodworker's vise. Now the piece of foil in the extension forward of the block and joining the portions 205 and 206 of it, is on the top. That joining portion now is gently pulled slightly upwardly so as to draw together the resulting two opposing parts of it (on either side of its middle) to bring them toward one another so that the adhering damming material on each of the opposing parts is brought into face to face contact.

The entire length of each of the opposed extension parts 205 and 206 thereafter are brought together to continue to bring the damming material in a band on both of them into face to face contact. Thus in effect there is made what can be called loosely a flange or wing of the originally excess foil projecting longitudinally vertically outwardly as a joint single extension emanating from about the middle of that side of block 204.

Figures 16, 17:
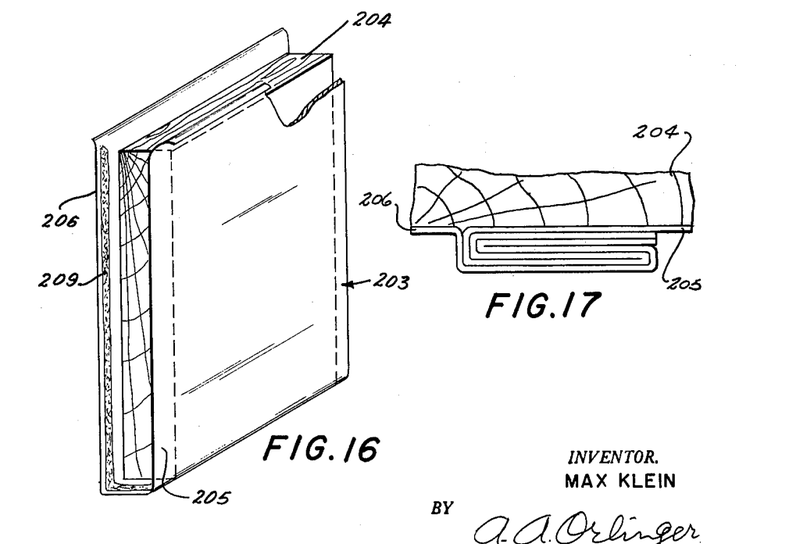
FIG. 16 is a perspective view of a sheet of aluminum foil about a block of wood used to help in shaping an aluminum liner, or polymerization envelope, for use in the polymerization zones.
FIG. 17 is a fragmentary horizontal section along the line 17—17 of FIG. 16, but showing the aluminum foil forward of the block folded over itself to close off that vertical end in a liquid tight fold.

Then, as noted by following FIG. 17, the vertically outermost about one-third of that wing is folded over along its length backward over about the same amount of the middle part of that wing. The wing now has about two-thirds of its original width, and the outermost half (actually again one-third of its original width) of the thus shortened wing is then folded in half leaving a narrower wing about one-third of its original width. This now so-called triple-ply is folded against the foil adjacent the side of the block and with the earlier folded portions covered from view. A roller then is run over the triple-ply fold to flatten it down smoothly against the foil outside the side of the block.

A similar triple-ply fold is made in the same way, using also a band of damming material, and similarly rolled smoothly flat against the other side of the block. In that way the extensions projecting outwardly respectively from both sides of the block are converted into dependable liquid seals.

After opening the vise to release the aluminum envelope-covered block, the latter then is slid out of the open-ended (the top extensions of the foil having remained separated) aluminum envelope.

The possibility of the walls of the closed lower end of the envelope collapsing by any suction caused by the block's slipping out of the envelope is avoided by first drilling a hole or two vertically downward through the entire height of the block to penetrate its bottom. That allows air to reach the bottom of the envelope, and thereby to avoid any possibility of vacuum forming as the block is being slid out of the finished envelope.

More of such envelopes are prepared to have one for each polymerization zone, and one is inserted into each of them, and each envelope is filled with monomer to be polymerized. Then the extensions 207 and 208 at the open top of each envelope are brought together across the top and simply folded over once or twice merely to provide a simple closing against contamination.

After the polymerization is completed, the envelope containing the finished polymer slips out of the bottom of the polymerization zone after the bottom closure 165 is opened as already described.

While it is advantageous to build the entire assembly of h-c-f cells and polymerization zones with their top and bottom closures of aluminum throughout, when the monomer will be loaded into aluminum envelopes, as just described, the apparatus for such an operation can have at least the common walls or heat transfer walls such as 44 and 50 made of copper. Any other parts can also be made of copper if for some reason desired instead of aluminum.

Of course, the gaskets for the h-c-f cells are made of suitable material for the fluid, usually water, while the gaskets 147 and 149 for the polymerization zones are of material inert to the monomer and the polymer, for example, "Teflon" polymerized tetrafluoroethylene resin. A suitable composition for a damming material for use in making the aluminum foil envelopes is, for example, an eight percent aqueous solution of polyvinyl alcohol (30 centipose viscosity by Brookfield viscosimeter; ninety-eight percent hydrolyzed).

The apparatus and its use in preparing a specific polymer are illustrated more specifically by, but not to be restricted to, the following example:

The apparatus is constructed entirely of aluminum h-c-f cells and polymerization zones with the channels 45 and 46 of the zones with a three inch base and one inch flanges and thirty inch length; with the heat exchange walls 44 and 50 and end walls 43 being thirty inches high and twenty inches wide and three-sixteenth inch thick. Channels 35 through 38 have one and one-half inch base and one inch flanges.

Monomer consisting of one hundred parts styrene and two-tenths part cumene hydroperoxide as catalyst was fed into each polymerization zone. With the nipples 33 and 34 of the h-c-f cells connected to their respective input and return flow manifolds, water at one hundred and eighty degrees Fahrenheit is run through the cells for twelve hours and then at 150° for fourteen hours and at a rate to keep the contents of the polymerization cell below 180° F. during about the first three of those fourteen hours and then not in excess of 160° F. for the balance of that stage. Then the water is run through at 190° F. for twelve hours to complete the polymerization.

Figure 13:
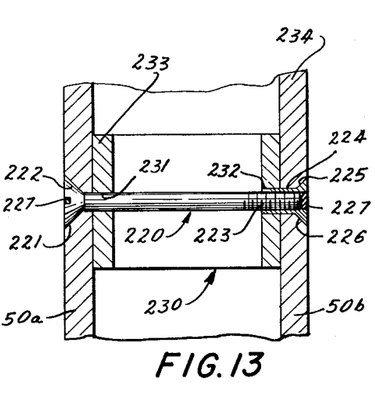
FIG. 13 is a fragmentary partial section of a heat-controlling-fluid cell showing a device for reenforcing it.
Figure 14:
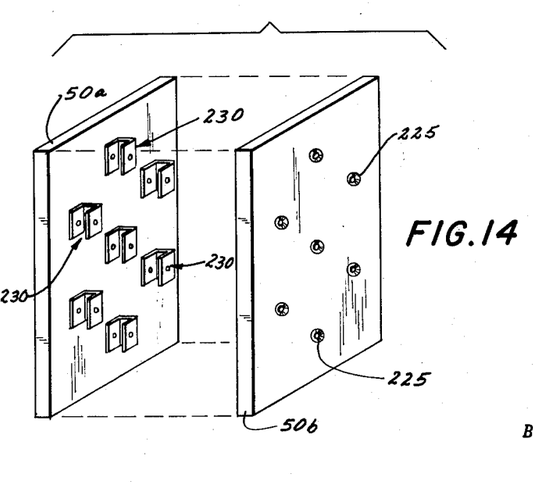
FIG. 14 is a partial expanded perspective view of part of a heat-controlling-fluid cell with one of the common walls moved to the right to show a distribution of several of the reenforcing devices seen in FIG. 13.

To be able to use the thinner range of heat exchange wall thickness, such as under one quarter inch wall, even with the high pressure developed at high water flow rates, it is advantageous to include in the h-c-f cells at least one and even up to a half dozen or more reenforcing units such as illustrated in FIGURES 13 and 14. Although not restricted to the specific unit described, this very effective unit comprises a bolt 220 inserted through a countersunk frusto-conical bolt hole in heat exchange wall 50a with its frusto-conical head 222 in accurate registry with the bolt hole for the outer face of the head to come evenly into the plane of the outer surface of wall 50a. The threaded end 223 of bolt 220 is engaged securely by the threads of sleeve nut 224 inserted in the countersunk hole 225 in heat exchange wall 50b so that the outer face of the frusto-conical head 226 of nut 224 falls substantially evenly into the plane of the outer surface of wall 50b. Then the slots in the frusto-conical heads of the bolt and nut are filled wtih metal filler inert to and compatible with the monomer and polymer to a level even with the plane of the outer surface of each of the walls 50a and 50b respectively.

This bolt and nut combination safeguards bulging of the walls 50a and 50b into either of the adjoining polymerization zones. FIG. 14 illustrates an arrangement that takes seven of these bolt and nut combinations an individual h-c-f cell. In addition, to resist any pressure that might possibly develop from continued application of static head from the polymerization zones to tend to move some part of walls 50a and 50b toward one another within the h-c-f cell, an additional member is included in the reenforcing unit. A simple and highly effective example is a short section of channel iron 230 having opposed bolt holes 231 and 232 respectively inserted before the bolt and nut units are inserted, with the bolt holes of the channel section 230 in registry with the corresponding bolt holes 221 and 225 in walls 50a and 50b respectively. Then the bolt and nut are inserted as before and also through the bolt holes 231 and 232 of channel section 230. Suitable gaskets (not shown) are included between the flanges 233 and 234 of channel section 230. The wall to wall width of the channel section is such as to give a snug fit with the gaskets against the h-c-f cell faces of walls 50a and 50b and without exerting any pressure to distort them out of their respective normal planes. When channel sections 230 and their gaskets are not used, gasketing "dope" is applied at least on the frusto-conical surfaces of the bolt holes 221 and 225. In any event, when it is desired to operate under pressure in the polymerization zones, the availability of the reenforcing units including the channel sections 230 enables the possibility of using a thinner heat transfer wall than would be possible without use of such unit.

Figure 7:
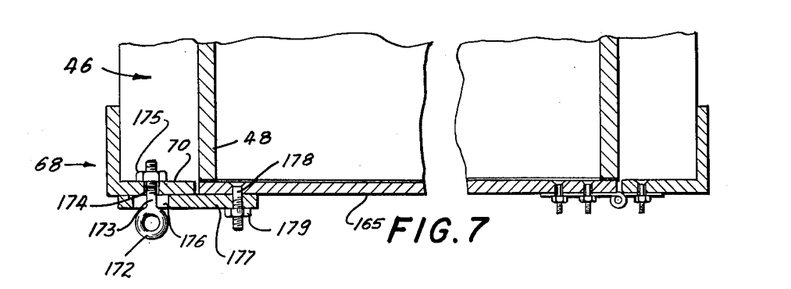
FIG. 7 is a vertical fragmentary view from side to side showing the bottom part of a polymerization chamber and a closure closing it, and a manner of attachment of the closure.
Figure 12:
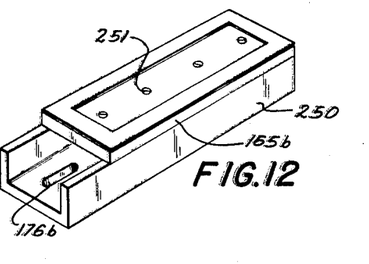
FIG. 12 is a modification of a closure, such as that for the bottom of a polymerization zone, and showing a reenforcement applied to the closure.

When working with pressure in the polymerization unit either a heavier or reenforced bottom closure for it is desirable. A reenforced closure is illustrated in FIG. 12 where the member 165b is a bottom closure of ordinary thickness such as three-sixteenths inch (e.g. as in FIGS. 7 and 8). It is reenforced by engaging to its underside a reenforcing member such as channel iron 250 (with upward directed flanges). With such reenforcing member an extension 177 as shown in FIG. 7 can be eliminated. Instead the eye-ring bolt 173 (of FIGS. 7 and 8) can be lengthened to operate through slot 176b of channel 250. The later is held fixedly attached to closure 165b by suitable means such as a non-tapering (i.e. machine) screws inserted through countersunk holes in closure 165b, having frusto-conical heads, and threaded into the base of channel 250. It is also possible to reenforce closure 165b with a channel such as 250 but with its flanges depending and its base adjacent the underside of closure 165b.

Figure 20:
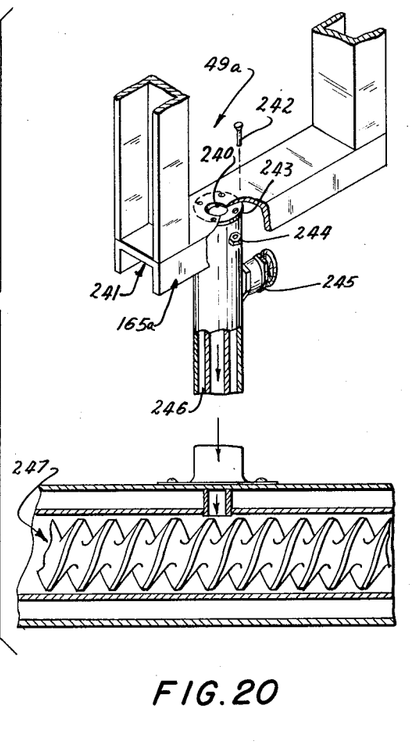
FIG. 20 is a fragmentary vertical view partially in broken section showing a modified polymerization zone with a fixedly secured bottom and a jacketed line leading down from it to a jacketed screw conveyor.

When working under pressure in the polymerization zones, it is possible to empty them without opening their bottom closures. A modification for that practice is shown in FIG. 20. In it, a jacketed molten polymer outlet drain 240 is connected to the underside of the base 241 of the closure 165a by bolts 242 with inverted frusto-conical heads inserted through countersunk bolt holes in base 241 and bolt holes in flange 243 connected with the drain line 240, the bolts being tightened by nuts 244. When the polymerization is completed, the heating fluid, e.g. water, is fed through the h-c-f cells at a temperature sufficient to melt the polymer. Then under sufficient pressure in the polymerization zone the thus liquid polymer is propelled out of the zone through drain outlet 40, after valve 245 is opened, to a suitable jacketed screw conveyor 247. While not shown, the jacket 246 about the drain line can be interconnected with the jacket about the conveyor 247.

While styrene is named as a specific monomer, other vinyl monomers can be similarly polymerized by the apparatus, e.g. halogenated styrenes as para-chlorostyrene, mixed dicholostyrenes, mixed vinyltoluenes, vinyl acetate, methyl methacrylate, acrylonitrile, vinyl pyrrolidone, and mixtures of any of the above. Obviously, various formulations with any of the above monomers with or without customary catalyst, modifiers, toughening agents, and other compatible substances can be polymerized in the apparatus. In fact, any of the various constituents of a formulation, and even finely divided inert or compatible substances can be added at any time before gelation occurs. These unusual advantages are available because the unique structural features of the apparatus enable opening any one or all of the polymerization chambers at any time in the polymerization cycle.

The distinct structure of the apparatus enables removing any h-c-f cell with its polymerization zone without shutting down the operation of the others.

The structural features of the apparatus enable the easy polymerization of disaggregated solid monomers, for example, the alkali and alkaline earth metal salts of methacrylic acid, methacrylamide, and others.

Instead of a number of individual covers, such as cover 65, one for each polymerization chamber, a single overall cover can be used, of such dimensions to cover all of the polymerization chambers as a whole. Such cover may be sheet metal or alloy or a non-metal material, and should be inert to the substance being polymerized. Such single overall cover merely may be placed over the tops of the whole series of polymerization chambers. It may be hinged to some suitable part of the apparatus, such as any of the exposed vertical walls of any of the compartments or outwardly extending flanges of vertical channels, and at suitable locations along the length of the apparatus.

A form of gasketing advantageously effective between the separable parts of the polymerization cells and of the heat-control chamber and at any bolt holes in the intermediate portions of the common walls, such as holes 221 and 225, for anchoring a bulge-resisting bolt, is a paste prepared by mixing approximately equal portions of an exothermically polymerizable organic substance and a solid polymer of it in finely divided form (i.e. about 100% through a 20 mesh screen). Such paste can be applied on each of the surfaces to be gasketed, and then set or cured by applying heat. For example, steam can be blown against the surfaces between which the layer of paste is held. It is usually desirable that such paste be of the same material that is to be polymerized, for example, in carrying out the polymerization of polystyrene, it is desirable to prepare the paste from about equal portions of styrene monomer and finely comminuted solid polystyrene.

The various compartments are not limited to dimensions already specifically mentioned. Their dimensions can be varied in accordance with the size and strength availability of the selected structural members, particularly the exterior walls of the compartments. Thus, a commercial production form of the apparatus has polymerization chambers of dimensions that yield a plurality of individual polymer blocks 26 inches high by 20½ inches wide by 4 inches thick, and weighing 70 to 75 pounds or more.

Such apparatus has turned out such blocks of polystyrene starting with liquid styrene monomer, in the proportions of 100 parts to 0.1 to 0.2 part of cumene hydroperoxide as catalyst, under an operating cycle involving heating the starting mixture in the polymerization cells for two hours, while pumping water at 190° F. through the heat-control chambers until the peak of the exothermic reaction; then pumping water at 175° F. for two hours through the control chambers, and finally feeding through them for five hours steam at 240° F.

Considerably larger compartments can be used, to yield blocks, e.g. of polystyrene, weighing several hundred pounds and even the best part of one thousand pounds, within the limits of the commercially available sizes of rolled or milled aluminum or other suitable metal sheets.

Instead of securing together separably the four individual parts, namely, the top, bottom, and the two vertical (or exposed, exterior, non-common or unshared) sides of the heat-control chamber or unit, such as the four channels 35, 36, 37 and 38 in FIG. 2, they can be welded together at their respective corner junctions. They thus provide a welded together rectangular frame similar to the rectangular frame shown as the second unit from the left in FIG. 2.

Then instead of separably securing the opposed outer edges surrounding the two open faces of that rectangular frame respectively to the corresponding opposed faces of common walls 43 and 44 by separable securing means, such as the bolts and nuts earlier above mentioned, the respective outwardly extending flanges of these four channels making up that rectangular frame can be welded to the corresponding outer ends of the opposed faces of the walls 43 and 44. Thereby a completely enclosed, welded together heat-control chamber is formed.

Similarly, the nearer flanges 142 and 145 of channels 47 and 48, constituting the exposed (or unshared) vertical walls of the adjoining polymerization cell then likewise can be welded to the corresponding vertical ends of the side facing them of common wall 44. That polymerization cell then can be completed with a bottom closure such as shown in FIG. 7 and a top closure such as closure 65 (FIG. 2).

Such welding of these respective channels to the end and common walls 43 and 44 and similarly with the other heat-control chambers and polymerization cells along the length of the apparatus provides the apparatus as an overall constantly secured rigidly fixed unitary assembly. Nevertheless, in such overall constantly secured rigidly fixed unitary assembly, contents of any polymerization cell can be removed, by opening its bottom closure, without any need of separating any other adjoining polymerization chamber and heat-controlling-fluid cell from one another or disturbing the respectively separate securing means for fixedly securing them together.

Alternatively, instead of closing the bottom of each polymerization cell by a closure such as shown in FIG. 7, such included polymerization cell can be completed by welding to the bottom ends of its upright channels 47 and 48 a bottom channel 165$a$ (see FIG. 20) with a jacketed drain line attached to it as shown in FIG. 20.

Then also, instead of such a drain line depending from base 241 of closure 165$b$, base 241 can be completely continuous without any opening. However, then a similar aperture or opening in the lower end of either of the two vertical channels at its junction with base 241 (i.e. at the bottom of the polymerization cell) can communicate with a jacketed drain extending horizontally outwardly from said aperture, for example, between the outwardly extending flanges of that upright channel.

Then a similarly jacketed drain extending similarly horizontally outwardly from the bottom of the same side of each of the polymerization cells can communicate with a common jacketed manifold to receive melted polymer from all of them.

While the invention has been explained by describing certain specific embodiments of it, it is understood that various substitutions and modifications can be made in any of them within the scope of the appended claims which are intended also to embrace equivalents of any of the modifications.

This application is a continuation-in-part of my copending application Serial No. 551,337, filed December 6, 1955 and now abandoned.

What is claimed is:

1. Apparatus effective for mass or bulk polymerization of organic substances which polymerize exothermically to form plastic products, which apparatus comprises a plurality of separate compartments, namely, polymerization chambers for holding liquid monomer to be polymerized, and heat-controlling-fluid cells for confining heat-controlling-fluid to flow through them; said compartments being assembled in a series starting and ending with a heat-controlling-fluid cell and with each such latter cell completely closed except for fluid inlet and outlet, and with each polymerization chamber being closed-sided and sandwiched between and secured to a pair of heat-controlling-fluid cells and separated from each respectively adjoining such cell by a common wall of relatively light weight metal of high heat conductivity; with the vertical ends of the exposed sides of each pair of compartments including an adjoining polymerization chamber and a heat-controlling-fluid cell and also the transverse sides of the top and bottom of the heat-controlling-fluid cell being fixedly secured, by respectively separate securing means for each individual pair of said adjoining individual polymerization chamber and heat-controlling-fluid cell, to the outer ends of the common wall between them, to provide an entirely overall rigidly fixed unitary assembly; and each polymerization chamber being provided at its bottom with a closure that closes said bottom, and means operatably engaging with said closure to enable said individual polymerization chamber to be opened and its contents removed from it separately and independently at any stage of the operation from monomer to finished polymer and independently of the operation of any other polymerization chamber and without any need of separating any other adjoining polymerization chamber and heat-controlling-fluid cell from one another or disturbing the respectively separate securing means for fixedly securing them together.

2. Apparatus effective for mass or bulk polymerization of organic substances which polymerize exothermically to form plastic products, which apparatus comprises a plurality of separate compartments, namely, polymerization chambers for holding liquid monomer to be polymerized, and heat-controlling-fluid cells for confining heat-controlling-fluid to flow through them; said compartments being assembled in a series starting and ending with a heat-controlling-fluid cell and with each such latter cell completely closed except for fluid inlet and outlet, and with each polymerization chamber being closed-sided and sandwiched between and secured to a pair of heat-controlling-fluid cells and separated from each respectively adjoining such cell by a common wall of relatively light weight metal of high heat conductivity; with the vertical ends of the exposed sides of each pair of compartments including an adjoining polymerization chamber and a heat-controlling-fluid cell and also the transverse sides of the top and bottom of the heat-controlling-fluid cell being fixedly secured, by respectively separate and separable securing means for each individual pair of said adjoining individual polymerization chamber and heat-controlling-fluid cell, to the outer ends of the common wall between them, to provide an entirely overall rigidly fixed unitary assembly; and each polymerization chamber being provided at its bottom with a closure that closes said bottom; means operatably engaging with said closure to enable opening it without disturbing said overall rigidly fixed unitary assembly; and which separable securing means enable removing any one of the assembled series of compartments without any need of separating any other adjoining polymerization chamber and heat-controlling-fluid cell from one another or disturbing the respectively separate securing means for fixedly securing them together.

3. Apparatus as claimed in claim 2, wherein the common wall is sheet aluminum from about one-eighth to about one-half of an inch thick.

4. Apparatus effective for mass or bulk polymerization of organic substances which polymerize exothermically to form plastic products, which apparatus comprises a plurality of separate compartments, namely, polymerization chambers for holding liquid monomer to be polymerized, and heat-controlling-fluid cells for confining heat-controlling-fluid to flow through them; said compartments being assembled in a series starting and ending with a heat-controlling-fluid cell and with each such latter cell completely closed except for fluid inlet and outlet, and with each polymerization chamber being closed-sided and sandwiched between and secured to a pair of heat-controlling-fluid cells and separated from each respectively adjoining such cell by a common wall of relatively light weight sheet metal of high heat conductivity; the exposed side walls of the polymerization chamber and the exposed walls of the heat-controlling-fluid cell being respectively separate lengths of metal channel having their flanges extending outwardly and each being fixedly secured, by respectively separate and separable securing means for each individual pair of such adjoining chamber and cell, to the outer ends of the common wall between each adjoining polymerization chamber and heat-controlling-fluid cell, to provide an entirely overall constantly rigidly fixed unitary assembly; and each polymerization chamber being provided at its bottom with a closure that closes said bottom; means operatably engaging with said closure to enable opening it without disturbing said overall rigidly fixed unitary assembly; and which separable securing means enable removing any one of the assembled series of compartments without any need of separating any other adjoining polymerization chamber and heat-controlling-fluid cell from one another or disturbing the respectively separate securing means for fixedly securing them together.

5. Apparatus as claimed in claim 4, wherein gasketing material is interposed in the junctions between the various parts of the controlling-fluid cells and the junctions between them and the common walls.

6. Apparatus as claimed in claim 5, wherein the gasketing is a solid layer of the polymerization product of a paste comprising a mixture of about equal portions of the liquid monomer of said exothermically polymerizable organic substance and its solid polymer in a finely comminuted form.

7. Apparatus as claimed in claim 4, wherein the common wall between each polymerization chamber and heat-controlling-fluid cell is sheet aluminum and at least the lengths of metal channel constituting the sizes, top and bottom of the controlling-fluid cell are extruded aluminum.

8. Apparatus as claimed in claim 7, wherein gasketing material is interposed in the junctions between the various parts of the controlling-fluid cells and the junctions between them and the common walls.

9. Apparatus as claimed in claim 1, wherein in addition there is hingedly secured to the polymerization chamber by securing means at one end of the top of said chamber a top closure that is swingable about said securing means, thereby upon opening said closure providing open access through the top to any polymerization chamber without disturbing the overall rigidly fixed unitary assembly of the apparatus and without interfering with the polymerization operation in any other polymerization chamber.

10. Apparatus effective for mass or bulk polymerization of organic substances which polymerize exothermically to form plastic products, which apparatus comprises a plurality of separate compartments, namely, polymerization chambers for holding liquid monomer to be polymerized, and heat-controlling-fluid cells for confining heat-controlling-fluid to flow through them; said compartments being assembled in a series starting and ending with a heat-controlling-fluid cell and with each such latter cell completely closed except for fluid inlet and outlet, and with each polymerization chamber being closed-sided and sandwiched between and secured to a pair of heat-controlling-fluid cells and separated from each respectively adjoining such cell by a common wall of relatively light weight metal of high heat conductivity; with the vertical ends of the exposed sides of each pair of adjoining polymerization chamber and heat-controlling-fluid cell and also the transverse sides of the top and bottom of the heat-controlling-fluid cell being fixedly secured, by respectively separate securing means for each individual pair of said adjoining individual polymerization chamber and heat-controlling-fluid cell, to the outer ends of the common wall between them, to provide an entirely overall rigidly fixed unitary assembly; and each polymerization chamber being provided by its bottom with a closure that closes its bottom, which closure is openable by means operatably engaging therewith and without need to separate any heat-controlling-fluid cell and polymerization chamber from one another, thereby permitting, upon opening said closure without separating any such cell from any such chamber, removal of contents of the polymerization chamber from its bottom and through the opening thus provided.

11. Apparatus effective for mass or bulk polymerization of organic substances which polymerize exothermically to form plastic products, which apparatus comprises a plurality of separate compartments, namely, polymerization chambers for holding liquid monomer to be polymerized, and heat-controlling-fluid cells for confining heat-controlling-fluid to flow through them; said compartments being assembled in a series starting and ending with a heat-controlling-fluid cell and with each latter such cell completely closed except for fluid inlet and outlet, and with each polymerization chamber being closed-sided and sandwiched between and secured to a pair of heat-controlling-fluid cells and separated from each respectively adjoining such cell by a common wall of relatively light weight metal of high heat conductivity; with the vertical ends of the exposed sides of each pair of adjoining polymerization chamber and heat-controlling-fluid cell and also the transverse sides of the top and bottom of the heat-controlling-fluid cell being fixedly secured, by respectively separate securing means for each individual pair of said adjoining individual polymerization chamber and heat-controlling-fluid cell, to the outer ends of the common wall between them, to provide an entirely overall rigidly fixed unitary assembly; and each polymerization chamber being provided at its bottom with a closure that closes its bottom, which closure is openable by means operatably engaging therewith and without need to separate any heat-controlling-fluid cell and polymerization chamber from one another, thereby permitting, upon opening said closure without separating any such cell from any such chamber, removal of contents of the polymerization chamber downwardly through the opening thus provided to a level below its bottom.

12. Apparatus effective for mass or bulk polymerization of organic substances which polymerize exothermically to form plastic products, which apparatus comprises a plurality of separate compartments, namely, polymerization chambers for holding liquid monomer to be polymerized, and heat-controlling-fluid cells for confining heat-controlling-fluid to flow through them; said compartments being assembled in a series starting and ending with a heat-controlling-fluid cell and with each such latter cell completely closed except for fluid inlet and outlet, and with each polymerization chamber being closed-sided and sandwiched between and secured to a pair of heat-controlling-fluid cells and separated from each respectively adjoining such cell by a common wall of relatively light weight metal of high heat conductivity; with the vertical ends of the exposed sides of each pair of adjoining polymerization chamber and heat-controlling-fluid cell and also the transverse sides of the top and bottom of the heat-controlling-fluid cell being fixedly secured, by respectively separate securing means for each individual pair of said adjoining individual polymerization chamber and heat-controlling-fluid cell, to the outer ends of the common wall between them, to provide an entirely overall rigidly fixed unitary assembly; tying means, extending across the interior of the heat-controlling-fluid cell between, and connecting with, its two opposing common walls to restrain said opposing walls from bulging into the respectively adjoining polymerization chambers, whereby the metal of said opposing walls can be thinner than that which otherwise would be necessary to withstand the pressure of the heat-controlling-fluid in the absence of said tying means.

13. Apparatus as claimed in claim 12, wherein any part of the typing means, which extends through a common wall is in liquid-tight engagement with it and any part of said tying means facing into a polymerization chamber lies within the plane of that face of said wall that is in the polymerization chamber.

14. Apparatus as claimed in claim 1, wherein the light weight sheet metal of high heat conductivity is non-ferrous and a member of the class consisting of metals and alloys having a heat conductivity coefficient within the range of that of aluminum, magnesium, copper, and silver; and which class includes said metals.

15. Apparatus effective for mass or bulk polymerization of organic substances which polymerize exothermically to form plastic products, which apparatus comprises a plurality of separate compartments, namely, polymerization chambers for holding liquid monomer to be polymerized, and heat-controlling-fluid cells for confining heat-controlling-fluid to flow through them; said compartments being assembled in a series starting and ending with a heat-controlling-fluid cell and with each such latter cell completely closed except for fluid inlet and outlet; and with each polymerization chamber being sandwiched between a pair of heat-controlling-fluid cells and separated from each respectively adjoining such cell by a common wall of relatively lightweight non-ferrous metal of high heat conductivity; with each polymerization chamber being closed at its vertical sides by having the vertical ends thereof fixedly secured to the corresponding vertical end of its respectively adjoining common wall; and each said chamber having at its bottom a closure that closes said bottom, with each transverse side of said bottom closure likewise fixedly secured to the lower end of its respectively adjoining common wall; and with each such fixed securing being made by respectively separate securing means for each individual pair of said adjoining individual polymerization chamber and heat-controlling-fluid cell, to the outer ends of the common wall between them, to provide an overall constantly rigidly fixed unitary assembly; and each polymerization chamber being provided at its bottom with an outlet which can be closed off without disturbing said overall rigidly fixed unitary assembly for said chamber to hold a charge of liquid to be polymerized therein, and which outlet can be opened to enable the contents of said chamber to be removed from it in liquid state and without any need of separating any adjoining polymerization chamber and heat-controlling-fluid cell from one another or disturbing the respectively separate securing means for fixedly securing them together.

References Cited in the file of this patent

UNITED STATES PATENTS

| 1,879,891 | Connett | Sept. 27, 1932 |
| 2,067,580 | Rohm | Jan. 12, 1937 |
| 2,136,425 | Fields | Nov. 15, 1938 |

UNITED STATES PATENT OFFICE
CERTIFICATE OF CORRECTION

Patent No. 3,140,917　　　　　　　　　　　　　　　July 14, 1964

Max Klein

It is hereby certified that error appears in the above numbered patent requiring correction and that the said Letters Patent should read as corrected below.

Column 6, line 62, for "bottom." read -- bottom, --; column 7, line 55, after "eye", second occurrence, insert a hypen; column 9, line 58, for "low" read -- lower --; column 9, line 75, and column 10, line 1, for "remain" read -- remains --; column 12, line 53, for "later" read -- latter --; column 13, line 6, for "dicholostyrenes" read -- dichlorostyrenes --; column 16, line 48, for "sizes" read -- sides --; column 17, line 14, for "by" read -- at --; line 31, for "latter such" read -- such latter --; column 18, line 17, for "typing" read -- tying --.

Signed and sealed this 1st day of December 1964.

(SEAL)
Attest:

ERNEST W. SWIDER
Attesting Officer

EDWARD J. BRENNER
Commissioner of Patents